Nov. 13, 1962  L. PÉRAS  3,063,621
REGULATION OF FREE-PISTON MACHINES
Filed Jan. 25, 1960
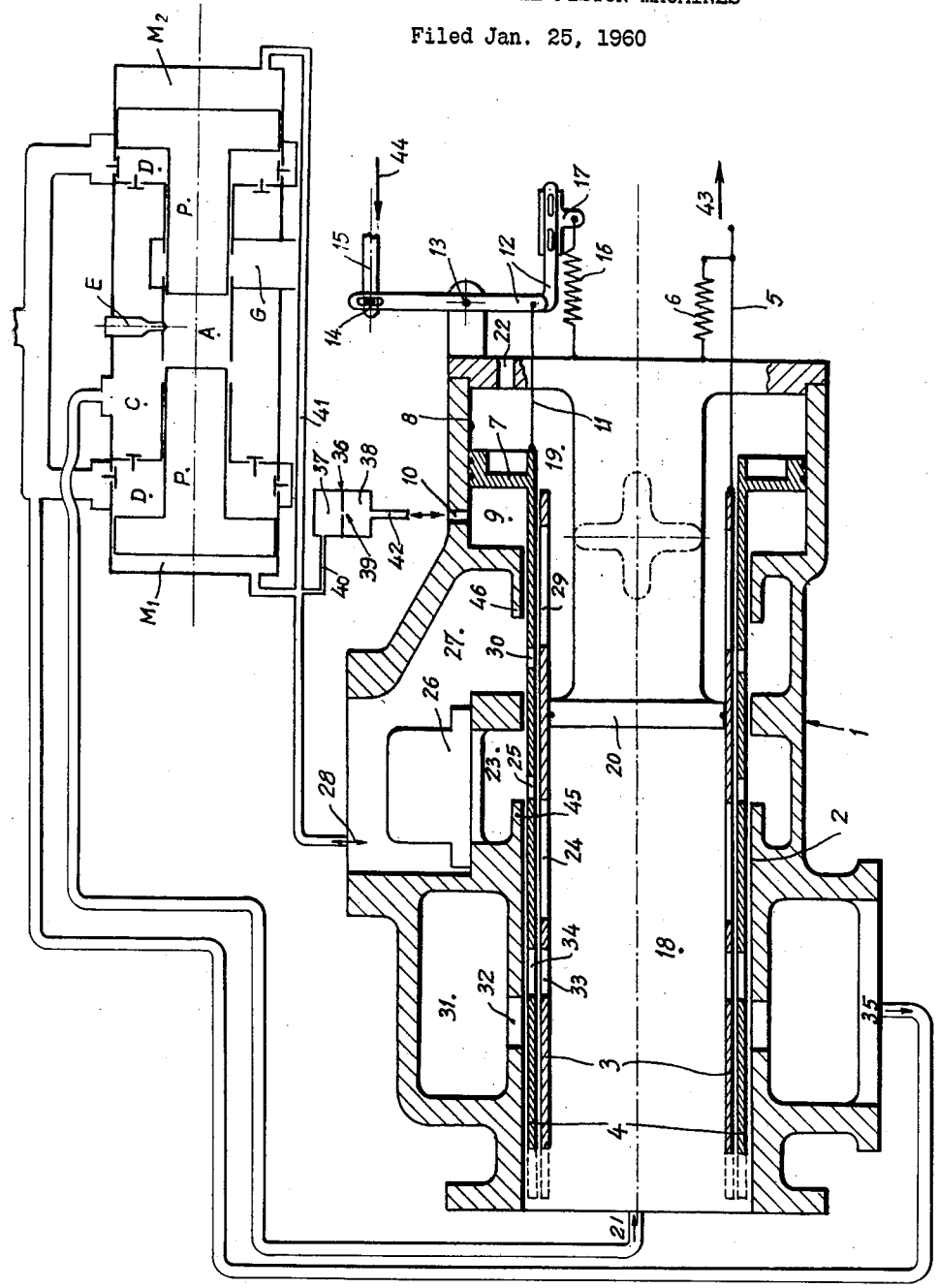
INVENTOR
Lucien Péras
BY       ATTORNEYS
Stevens, Davis, Miller & Mosher United States Patent Office 3,063,621
Patented Nov. 13, 1962

3,063,621
REGULATION OF FREE-PISTON MACHINES
Lucien Péras, Billancourt, France, assignor to Regie Nationale des Usines Renault, Billancourt, France
Filed Jan. 25, 1960, Ser. No. 4,550
Claims priority, application France Feb. 2, 1959
7 Claims. (Cl. 230—56)

This invention relates to free-piston machines and has specific reference to the regulation of machines of this character, notably those wherein the force necessary for returning the pistons is stored pneumatically in variable-capacity spaces called "cushions," as in the case of internal-compression, free-piston generators.

Usually, the regulation system provided for generators of this type comprises the following main elements:

*An injection pump.*—The power output per stroke is determined by controlling the injection pump rack or the position of the effective injection "notch." This "notch" modifies the piston stroke and therefore on the one hand the exhaust pressure of the generator—which is also called the operating pressure—and consequently the pressure prevailing in the scavenging case, and on the other hand the pressure obtaining in the aforesaid cushions when the pistons are close to their outer dead center.

*A stabilizer.*—Its function is to adapt the piston return force to the power output per stroke. In practice, it adapts the quantity of air contained in the cushions and therefore the pressure level in these cushions, the length of the piston stroke and the compression pressure in the power cylinder, to the injection notch, that is, to the pressure prevailing in the case.

*A recirculation valve.*—Its function is to permit the operation, under low-pressure running conditions, of the generator delivering its output through an orifice of substantially constant cross-sectional area such as a turbine, by discharging the case by Joule expansion and communicating this discharge to the inlet side of the compressors.

*A so-called "minimum-maximum" cam.*—For a given operating pressure this cam will limit the permissible instantaneous variations of the injection notch position in order to avoid either too long strokes during the load increase or too short strokes, that is, choking the generator as a consequence of a want of power compression or scavenging force, when the load decreases.

This form of regulation has a twofold drawback. On the one hand, it requires, in addition to the injection pump, three main mechanisms which are bulky and heavy, especially when fitted with their control means requiring in many cases oil-operated servomotors. On the other hand, its response is rather slow, for when it is desired to vary the load rather rapidly, this action is retarded by the "mini-maxi" cam which, being controlled by a pressure characteristic of the pressure level in the cushions, permits the continuation of the injection notch variation only when the maximum notch variation effected initially has become effective with respect to the different pressure levels of the generator through the medium of the stabilizer.

It is the object of the present invention to simplify the regulation assembly and to increase its quickness of response. To this end and according to the main arrangement of this invention, the quantity of air stored in the cushions is controlled directly, and the injection notch is controlled in turn by this quantity of air, that is, under practical conditions, by a pressure characteristic of the energy level available in the cushions, which may be—according to what is considered as the simplest solution—the mean pressure prevailing in the cushions.

If desired and without departing from the spirit and scope of the invention use may be made of the maximum cushion pressure or, better still, of the pressure existing in the cushions when the pistons are at a predetermined distance from the center of the generator, this last-mentioned arrangement being more accurate but also more complicated.

This type of regulation may give rise to certain difficulties, the main ones being listed hereafter:

Under full-load conditions, a rapid discharge of the cushions may produce piston strokes of excessive length.

Under moderate-load conditions, a rapid charge of the cushions may cause an incomplete combustion if the case pressure does not rise at a sufficiently fast rate.

In either case the invention provides means for avoiding these difficulties by reducing the exchanges of air with the cushions under extreme load conditions of the generator.

According to a specific form of embodiment of the present invention which is given by way of example:

The "inflation" of the cushions is effected from the scavenging case through a non-return valve when the pressure in this case exceeds the pressure in the cushions, as normally observed during the major portion of the cycle.

The cushions are discharged by throttling either toward the inlet of the compressors or directly to the atmosphere.

The adjustment of the quantity of air enclosed in the cushions is effected by means of a servo-apparatus comprising two distributors consisting of cylindrical slide valves controlled the one directly and the other by the characteristic pressure of the quantity of air enclosed in the cushions. The second slide valve may then carry along the rack of the injection pump through the medium of a linkage system providing an adjustable leverage to take due account of the dispersions from one generator to another and of possible variations in the calorific value of the fuel.

The recirculation is controlled by the displacement of the first slide valve and permitted by the second slide valve in order to prevent the recirculation from opening too rapidly in case of rapid decrease in the generator load from high load values, as this would cause a choking of the generator.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Oher objects and advantages will become apparent from the following description taken in conjunction with the accompanying drawing showing a typical form of embodiment of a device designed for regulating a single-cylindered generator, the single FIGURE of the drawing being an axial section of the regulator associated with the generator shown only in diagrammatic form.

As the principle of operation of the generator illustrated is already known to those conversant with the art, only those essential elements thereof which are directly concerned with the regulation set forth presently will be explained hereafter.

In the drawing, the reference letter A designates the power cylinder, P the opposed free pistons, $M_1$ and $M_2$ the cushions, C the scavenging case, D the compression cylinders, E the injector and G the gas exhaust pipe connected to a turbine.

The regulator illustrated comprises a distributor block formed with a bore 2 in which a pair of sleeve-like slide valves 3, 4 are slidably mounted.

The inner slide 3 is adapted to be actuated directly by means of a rod 5, and is urged to the left of the figure by a return spring 6.

The outer slide 4 comprises an enlarged piston-forming end portion 7 slidably fitted in a bore 8 of larger diameter formed at the corresponding end of block 1, this slide being adapted to occupy a position consistent with a characteristic pressure of the quantity of air enclosed in the cushions of the generator, this pressure being effective in the capacity 9 through a line connected to the orifice 10. Moreover, this slide 4 is connected through a link 11 to a pivoting lever 12 fulcrumed on a fixed pin 13 and is connected at 14 to the link 15 controlling the rack of the injection pump (not shown). The law governing the displacements of this slide is adhered to by means of a traction spring 16 acting against the pressure exerted within the capacity 9, this spring having its anchoring point adjustable due to the provision of a member 17 the position of which is adjustable along the lever 12, as shown.

The inner space of these slides is divided into two chambers 18, 19 by means of a partition-forming member 20 closing the block 1 at one end, the rods 5 and 11 extending through orifices formed in this member 20, the latter having anchored thereon, on the other hand, the springs 6 and 16; besides, the support of the aforesaid fulcrum pin 13 is rigid with this member 20.

The chamber 18 communicates directly with the scavenging case of the generator and the air therefrom flows to the regulator in the direction of the arrow 21.

The other chamber 19 communicates through the orifice 22 formed in the member 20 with the surrounding atmosphere.

The block 1 comprises additional chambers surrounding the above-described slides; thus, adjacent to the chamber 18 connected to the scavenging case is an annular chamber 23 communicating with the bore 2 and adapted to be connected to the chamber 18 through ports 24 and 25 formed in the slides 3 and 4, respectively.

Moreover, this annular chamber 23 communicates through a non-return valve 26 with another chamber 27 formed in the block 1 and having its orifice 28 adapted to be connected to the cushion-forming chambers of the generator.

The chamber 27 communicates similarly with the bore 2 but on the side of the other chamber 19 by virtue of the ports 29 and 30 formed in the slides 3 and 4, respectively.

It will be observed that the aforesaid ports 24, 25 and 29, 30 formed in the walls of the cylindrical concentric slides 3 and 4 are so located as to establish only one of the aforesaid communications at a time, according to the direction of the relative displacement of these slides.

The block 1 is also formed with an additional chamber 31 opening through orifices or ports 32 into the bore 2, on the side of the chamber 18 connected to the scavenging case, these chambers being adapted to be interconnected through the ports 33 and 34 respectively of the slide-forming pistons 3 and 4, whereas chamber 31 is connected through a port 35 to the inlet duct of the generator compressors.

The drawing also shows a means, proposed as one of the simplest solutions to this problem, for applying to the chamber 9 a pressure characteristic of the pressure level in the cushions $M_1$ and $M_2$, in this case the mean pressure prevailing in these cushions.

This mean pressure is obtained through the medium of a box 36 divided into two chambers 37, 38 by an intermediate partition in which a small orifice 39 is formed, the first chamber 37 being connected through a pipe 40 of relatively small inner diameter to a pressure-equalizing duct 41 having the obvious function of equalizing the pressures in the cushions $M_1$ and $M_2$, the other chamber 38 of box 36 being connected through a pipe 42 to the orifice 10 of chamber 9, as shown.

The regulator described hereinabove operates in the manner described hereinafter with reference to other possible embodiments and features of the arrangement permitted by this invention.

Assuming that the component elements of the regulator are in the relative positions shown in the drawing, the power may be increased at will by moving the control slide 3 in the direction of the arrow 43. As a consequence of this movement the ports 24 of slide 3 uncover the ports 25 of slide 4. The chamber 18 and consequently the scavenging case are thus allowed to communicate with the annular chamber 23. Thus, due to the presence of the non-return valve 26, the cushions $M_1$ and $M_2$ communicating directly with the capacity 27 are inflated. This inflation, due to the increase in the characteristic pressure of the volume of air stored in the aforesaid chamber 9, causes the other slide 4 to move in the same direction.

Due to this movement of slide 4, the inflation ceases immediately as the ports 24 and 25 are no more registering with each other, and on the other hand the injection "notch" is increased by the action of rod 11, lever 12 and link 15 (arrow 44).

By modifying the position of the fulcrum 14, the lever arm can be adjusted, in the case of a direct and linear control of the injection notch, as a function of the slide movement. If a linear law is not satisfactory, a driving cam or any other suitable control system may be resorted to.

The power may be reduced by displacing the slide 3 in the opposite direction. Thus, the ports 29 of slide 3 uncover the ports 30 of slide 4 and, through the medium of chamber 27, the cushions are discharged into the chamber 19, that is, to the atmosphere, through the port 22. The pressure is thus reduced in chamber 9 and the slide 4 moves in turn, thus causing a reduction in the injection notch until a position of equilibrium is attained which corresponds to the relative shifting of ports 29 and 30 to a non-registering position.

The cushions are vented to the atmosphere preferably through a filter which, in this arrangement, may be connected to the orifice 22 and designed firstly to protect the regulator. This unloading of the cushions may also be directed to the inlet duct of the compressors, so that the filter may be dispensed with, but in this case an undesirable pulsation may be observed.

On the other hand, for the purpose already specified hereinabove, the full-load and moderate-load exchange sectional areas of the generator may be reduced by providing baffle means 45 (in chamber 23) and 46 (in chamber 27) in order to cover alternately one portion of the ports 25 and 30 of slide 4 in the extreme positions.

During the operation under moderate-load conditions the recirculation is obtained as follows: the ports 33 of slide 3 are so positioned in relation to the orifices 32 of block 1 as to throttle the air from the scavenging case which is to flow through the chambers 18 and 31 to the inlet duct of the compressors. This can take place only if the ports 34 of slide 4 register at least partially with ports 33 and 32. Thus, the recirculation cannot take place when the injection notch and the pressure levels of the generators are too important.

Another advantage characterizing this regulation is that the control slide 3 may be driven to perform its maximum stroke in either direction without striking a stop for example of the "mini-maxi" type, so that the control linkage, notably the throttle or accelerator control linkage in the case of a vehicle, may be simplified considerably by making it possible to dispense with a double elastic element.

A regulator of this character may be adapted to a double generator having the single scavenging case by simply dividing each annular chamber (27 and 23) into two separate chambers, each chamber 23 communicating with the new corresponding chamber 27 through the medium of a non-return valve whereas each chamber 27 is connected to the cushions of a generator. Thus, detrimental or objectionable exchanges between the cushions of the two generators are avoided during the inflation of the cushions, as these generators operate not compulsorily in phase with each other.

Although the present invention has been described in conjunction with a preferred embodiment shown in diagrammatic form only, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a free-piston machine which includes a cylinder, a free-piston assembly operatively disposed in said cylinder and air cushion chambers at the outer ends of the piston assembly, a power control device comprising direct control means controlling the quantity of air enclosed in the cushion chambers, an injection adjustment device operatively associated with the control means, and pressure responsive means operatively connected to and automatically controlling the injection adjustment device in response to the power level of the air enclosed in the cushion chambers.

2. The combination of claim 1, wherein a scavenging case surrounds the cylinder and the quantity of air enclosed in the cushion chambers is modified by means of said direct control means for the inlet by utilizing the air pressure from the scavenging case and for the exhaust by venting the cushion chambers to the atmosphere, said pressure responsive means being utilized for neutralizing the air exchanges caused by the variation in position of the direct control means.

3. The combination of claim 1, wherein a scavenging case surounds the cylinder and compressors are provided and wherein the quantity of air enclosed in the cushion chambers is modified by means of said direct control means for the inlet by utilizing the air pressure from the scavenging case and for the exhaust by connecting the cushion chambers to the inlet side of the compressors, said pressure-responsive means being utilized for neutralizing the air exchanges caused by the direct control means by a predetermined rate of operation, a quantitative reduction in these air exchanges being obtained under extreme load conditions.

4. The combination of claim 3, wherein the placing of the scavenging case in communication with the inlet side of the compressors, at low operating pressures of the generator, is provided by the direct control means and permitted only by the pressure-responsive means.

5. The combination of claim 1, wherein said power control device comprises a distributor block having a bore, a pair of inner and outer, concentrically arranged, sleeve-like slide members slidably fitted in the bore of said block, the inner slide member being a part of the direct control means and the outer slide member constituting the pressure-responsive means, said block having an annular chamber surrounding the bore adjacent one end and said outer slide member being formed at one end with a piston disposed in the annular chamber and responsive to the air pressure in said cushion chambers, said bore having a fixed partition disposed internally of said slide members, said bore being on one side of the partition connected to the scavenging case and on the outer side connected to the atmosphere, said slide members being formed with ports and said block having passages connecting with the ports, a non-return valve, said slides being adapted through the ports and passages to communicate the scavenging case to the air cushions through the non-return valve and the air cushion chambers to the atmosphere according to the direction of movement of the inner slide member.

6. The combination of claim 5, wherein said passages formed in said distributor block are provided with baffle means so disposed as to cover one portion of said ports in the extreme positions of said slide members with a view to reduce air exchanges under moderate-load and full-load conditions.

7. The combination of claim 5, wherein a chamber connected to the inlet duct of the compressors is provided in said distributor around the bore, said last named chamber being adapted for the purpose of establishing air circulation, to be fed with air from said scavenging case through certain of the passages and corresponding ports, said ports being so disposed that the inner slide member sets up this connection during the moderate-load periods, said connection being permitted only through the consecutive and effective displacement of the outer slide member.

References Cited in the file of this patent

UNITED STATES PATENTS

| | | |
|---|---|---|
| 2,083,680 | Anderson et al. | June 15, 1937 |
| 2,472,934 | Beale | June 14, 1949 |
| 2,473,204 | Huber | June 14, 1949 |
| 2,666,569 | Bent | Jan. 19, 1954 |